United States Patent [19]
Fox et al.

[11] Patent Number: 5,243,810
[45] Date of Patent: Sep. 14, 1993

[54] HEADER TRANSPORT SYSTEM

[75] Inventors: Thomas R. Fox; Bruce R. Kidd, both of Winnipeg, Canada

[73] Assignee: MacDon Industries, Winnipeg, Canada

[21] Appl. No.: 978,455

[22] Filed: Nov. 19, 1992

Related U.S. Application Data

[63] Continuation of Ser. No. 783,197, Oct. 28, 1991.

[51] Int. Cl.[5] .................. A01D 34/40; A01B 73/00
[52] U.S. Cl. ............................ 56/228; 56/14.4; 56/14.5; 56/181; 56/DIG. 9
[58] Field of Search ............... 56/228, 14.3, 14.5, 56/14.4, 14.7, 153, 158, 181, DIG. 9

[56] References Cited

U.S. PATENT DOCUMENTS

| | | | |
|---|---|---|---|
| 3,279,158 | 10/1966 | Kirkpatrick et al. | 56/228 |
| 3,457,709 | 7/1969 | Killbery et al. | 56/11.9 |
| 3,778,987 | 12/1973 | Rankins | 56/377 |
| 4,026,365 | 5/1977 | Andersson et al. | 172/386 |
| 4,049,061 | 9/1977 | Van der lely et al. | 172/49 |
| 4,119,329 | 10/1978 | Smith | 280/415.1 |
| 4,346,909 | 8/1982 | Hundeby | 56/228 X |
| 4,384,445 | 5/1983 | McIlwain | 56/228 |
| 4,460,193 | 7/1984 | Dietz et al. | 280/415.1 |
| 4,573,309 | 3/1986 | Patterson | 56/14.9 X |
| 5,005,343 | 4/1991 | Patterson | 56/14.4 |

FOREIGN PATENT DOCUMENTS

| | | |
|---|---|---|
| 973367 | 8/1975 | Canada . |
| 1188899 | 6/1985 | Canada . |
| 1266739 | 9/1987 | Canada . |
| 2332690 | 6/1977 | France . |
| 1563852 | 4/1980 | United Kingdom . |

OTHER PUBLICATIONS

Brochure of Co-op Implements.

Primary Examiner—Stephen J. Novosad
Attorney, Agent, or Firm—Adrian D. Battison; Stanley G. Ade; Murray E. Thrift

[57] ABSTRACT

A header for a combine harvester includes gauge wheels which can be converted from a normal gauge position to a transport position in which the header is wholly supported by the gauge wheels and towed longitudinally of its length. One of the gauge wheels is a single wheel which moves inwardly toward the centre of gravity in the transport position. The other of the wheels is a walking beam system in the working position and forms a transverse axle in the transport position. Each of the gauge wheels is mounted upon a bracket which can pivot about a horizontal axis from a raised spring biased gauge position to a vertically depending position allowing rotation of the wheel about a vertical axis on the bracket. The header therefore can be transported without the necessity for a separate trailer system.

21 Claims, 6 Drawing Sheets

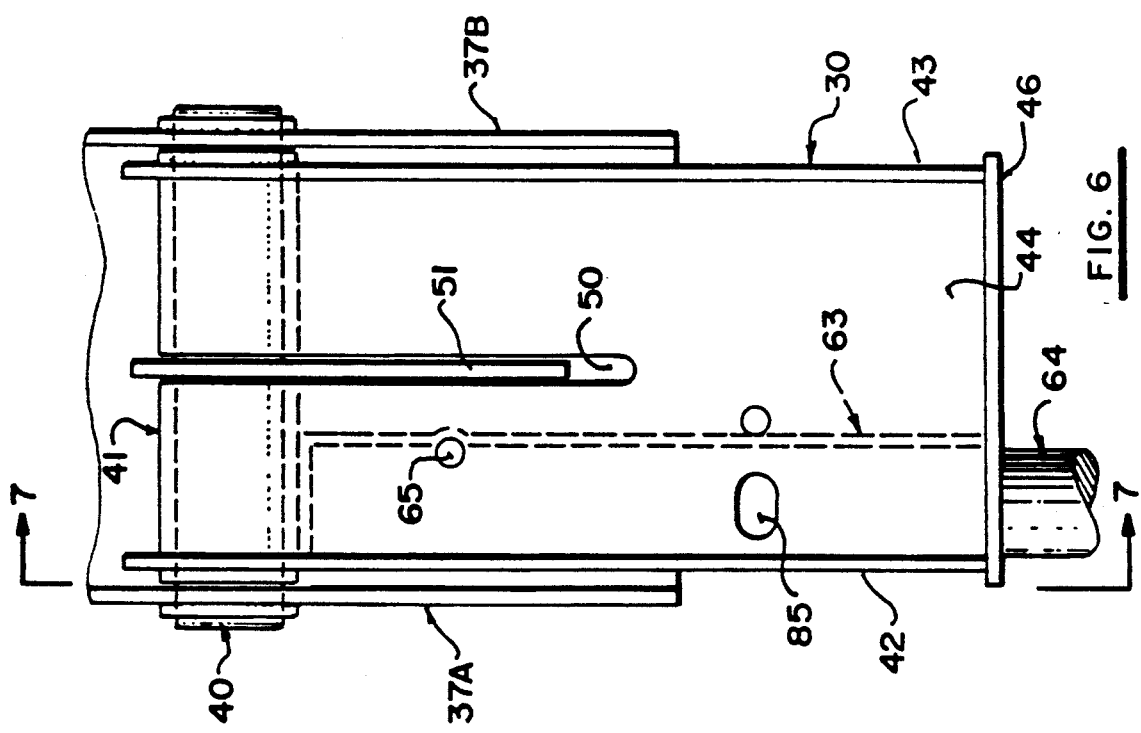
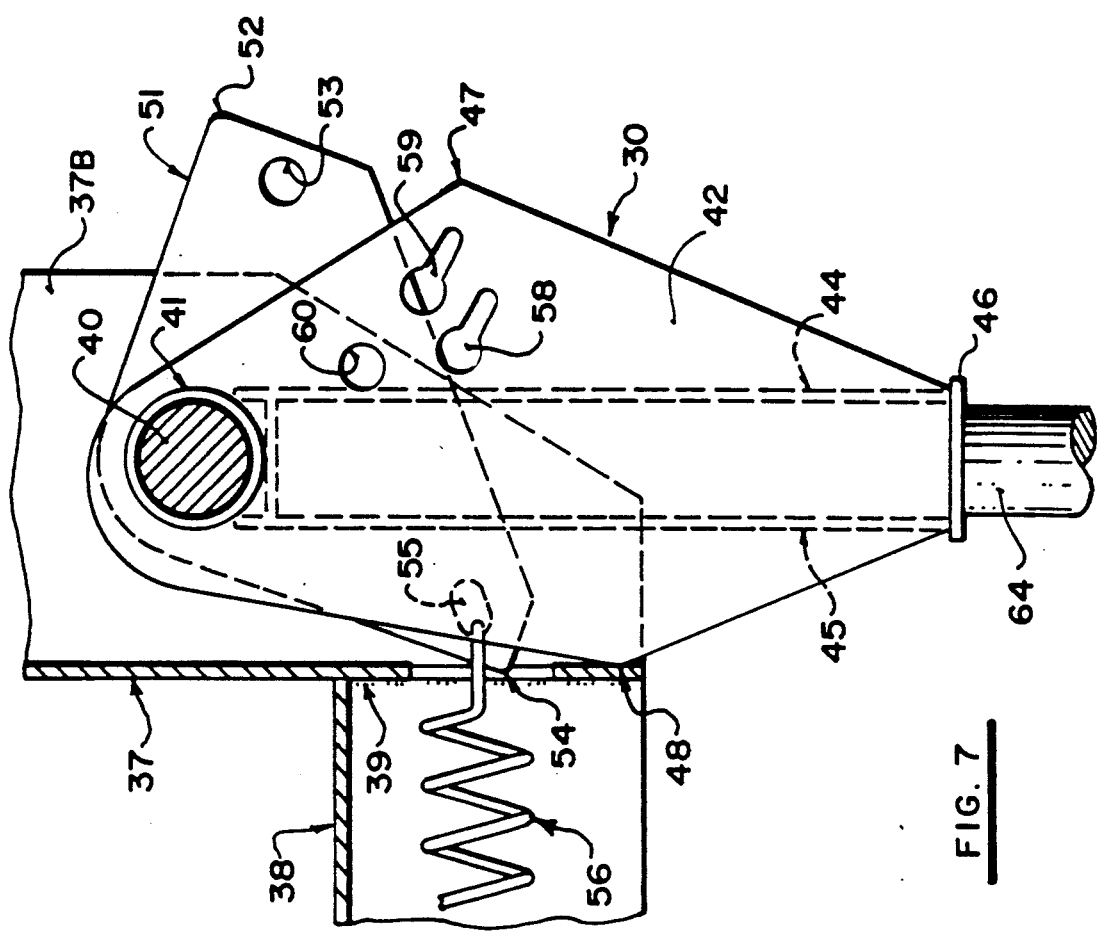

HEADER TRANSPORT SYSTEM

This application is a continuation of application Ser. No. 783,197, filed Oct. 28, 1991.

BACKGROUND OF THE INVENTION

This invention relates to a header transport system for use in transporting a crop harvesting header which may be of a type for attachment to a combine harvester or to a self-propelled tractor unit, or the header may simply be attached to a hitch member for towing by a separate tractor unit.

The present assignees MacDon Industries Ltd. have developed a unique header system known as the "Harvest Header" which is designed for attachment either to a swather tractor for use as a swather header or for attachment to a combine harvester for use as a direct cut header for the combine harvester or in some cases for use in a swathing action while attached to the combine harvester.

One embodiment of this machine is shown in U.S. Pat. No. 5,005,343 of the present assignees. This patent shows the main details of the header including a pair of side drapers which transport the cut crop inwardly from the ends of the header toward a central section. At the central section, when the device is for use with a combine harvester, a feed draper section is attached which feeds the transported crop rearwardly into the feeder housing of the combine harvester. The feed draper section can be removed so the header is then available for use as a centre discharge swather. When mounted on the feeder housing of the combine harvester, the mounting allows limited pivotal movement of the header about an axis parallel to the direction of working movement so that one end of the header can be raised relative to the other end in dependance upon the ground level. The header can of course also be raised and lowered by the conventional lifting action provided on the combine harvester generally by raising and lowering the feeder housing.

In the above patent, the header includes gauge wheels mounted adjacent respective ends of the header for engaging the ground to maintain the end of the header at a predetermined height just above the ground. The gauge wheels are shown simply as small diameter castor wheels of a type which generally have a solid tire and a diameter of the order of nine inches.

Since the filing of the application on which the above Patent issued, further developments have been made to the machine and the machine has been sold in significant numbers in Canada and U.S.A. A brochure showing the machine is submitted on the file of the present application. In this machine as sold, the small diameter gauge wheels have been replaced by larger diameter gauge wheels which are mounted on the header frame so as to trail behind the header frame at a position a short distance inward from the ends of the header. The gauge wheels are mounted for spring action so they are spring biased into contact with the ground but can pivot upwardly relative to the header frame thus allowing the header to float.

The present invention relates to a system for transportation of a header which is particularly but not exclusively designed for use with a header of the type as mentioned above.

It will of course be appreciated that an important aspect of any agricultural machine is the ability to transport the machine at a width that will allow it to move through relatively narrow openings and along roads. It is desirable therefore to provide a machine in the working position having a maximum operating width which in many headers can be as much as thirty to forty feet. At the same time it is necessary to reduce the width of the machine for transportation down to approximately ten feet.

The conventional technique for conversion of a combine harvester from a working position to a transport position is to provide a header transport trailer onto which the header is placed by the lifting mechanism of the combine harvester, following which the header is disconnected from the combine harvester allowing the two pieces to be transported separately. The header is thus towed on the trailer longitudinally while the combine simply drives forward with the header removed. This arrangement is used almost exclusively for combine harvesters having a width of cut which is sufficiently large to make this necessary. The trailer is an accepted technique except for a number of drawbacks. One serious drawback is the fact that the trailer is often in the wrong place. Thus the machine enters the field often at one end, carries out the harvesting operation throughout the field and then wants to leave at an opposite end of the field so that the trailer is parked at the entry end of the field and must be retrieved before transport can take place. Secondly, the correct positioning of the header on the trailer requires significant operator skill. Thirdly the trailer is an additional separate unit involving additional cost.

Swathers of the self propelled type use a different system of transportation but again one involving a transport trailer. In this case the conventional system is to drive the front wheels of the swather tractor, carrying the header, onto the trailer and then to pull the trailer longitudinally that is at right angles to the normal direction of the swather tractor. The rear wheels of the swather tractor then turn by castoring action at right angles to the normal direction to follow the trailer. In this way the swather tractor is towed at right angles to its normal direction.

Pull type swathers include a main frame at one end of which is attached a hitch or coupling to a towing vehicle. The main frame is supported by ground wheels generally positioned at the rear of the main frame at positions spaced apart across the width of working direction. As the ground wheels are designed to support the header frame, it is accepted practice that the ground wheels will also support the same header frame during the transport position. The conversion from working position to transport position is therefore carried out in many designs simply by pivoting the hitch to a transport position about a vertical axis at the rear end of the hitch and at the same time hydraulically pivoting the wheels about respective vertical axes adjacent the rear of the header frame so that the wheels turn from the working direction to a direction substantially at right angles to the working direction for transport.

Canadian Pat. No. 1,226,739 (corresponding to U.S. Pat. No. 4,573,309) assigned to the present assignees shows an arrangement in which the outside wheel is mounted on a crank so that as it is pivoted it also moves forwardly to a position underlying the draper section of the header. The swather therefore becomes a two wheel trailer to be towed longitudinally of the header with the wheel closer to the hitch remaining on the rear side of the centre of gravity and the outside wheel twisted around to the front side of the centre of gravity.

Other examples of conversion systems for transportation of pull type swathers are shown in U.S. Pat. Nos. 3,279,158 (Kirkpatrick), 4,346,909 (Hundeby), 3,457,709 (Kilberry), 4,460,193 (Dietz), Canadian Pat. No. 973,367 (International Harvester) and in brochures issued by Coop Implements and versatile. In many of these arrangements an additional wheel is added to the header frame at a suitable location so the header frame is supported on three ground wheels at spaced positions to form a stable structure. In the Versatile arrangement, the outside wheel can be a dual wheel system which rotates about a vertical axis directly between the wheels. The header frame is supported by a jack and a further wheel is added at the hitch end forwardly of the header frame to provide a stable trailer construction.

The same problem of transportation is also involved in other types of machines such as cultivators, seeders and rakes. Examples of transport systems for these machines are shown in U.S. Pat. Nos. 4,026,365 (Anderson), 4,049,061 (Van Der Lely), 3,778,987 (Rankins), and 4,119,329 (Smith). Other examples are shown in French Pat. No. 2332690 (Herriau) and British Pat. No. 1563852 (Amazonen). In these machines the system employed involves either the carrying on the frame of an additional wheel which comes into play only at the transport position or a system in which the frame is carried on front and rear castor wheels which rotate at 90° to take up the transport position thus supporting the frame on either side as it is pulled longitudinally.

However the machines of this type including the cultivators, seeders and rakes together with the pull type swathers are carried in the field by the ground wheels themselves and hence it is a conventional matter to move those ground wheels to support at least part of the load of the device during the transportation mode. The conventional header is however conventionally supported by the tractor unit and any wheels such as gauge wheels are generally there simply to provide a biasing or lifting force but not intended to support the full weight of the header.

SUMMARY OF THE INVENTION

It is one object of the present invention, therefore, to provide an improved header for a combine harvester which provides an effective transportation system without the necessity for a trailer.

It is a further object of the present invention to provide an improved method of transporting a header of a combine harvester.

It is a further object of the present invention to provide a harvesting machine having a ground wheel system for at least partly supporting the header section which enables simple and ready adjustment to a transport position.

According to a first aspect of the invention there is provided a header for attachment to a feeder housing of a combine harvester comprising a header frame extending longitudinally from one end of the header to an opposed end of the header in a direction transverse to a direction of intended working movement, and including support means extending forwardly of said direction, a cutting knife assembly mounted on said support means so as to be located at a forward edge of the header for cutting a standing crop, crop transporting means mounted on the header frame for transporting the cut crop longitudinally of the header frame, coupling means on the header frame for attachment of the header frame to the feeder housing of the combine harvester, said coupling means arranged for support of the header frame on the feeder housing to allow raising and lowering of the header frame by the combine harvester in conjunction with the feeder housing, means defining an opening adjacent the coupling means for discharge of transported cut crop through the opening for entry into the feeder housing, first and second gauge wheel means, first and second mounting means each mounting a respective one of the gauge wheel means on the header frame at a position thereon between said coupling means and a respective one of the ends of the header frame for engaging the ground, each of said first and second mounting means being arranged to allow rotation of the respective gauge wheel means from a gauge wheel position aligned with said direction to a transport position substantially at right angles to said direction for transport of the header, and ground wheel means carried on said header frame and arranged to provide support for the header frame relative to the ground when separated from the combine harvester for transportation movement substantially at right angles to said direction, said ground wheel means comprising said first and second gauge wheel means.

According to a second aspect of the invention there is provided a method of transporting a header of a combine harvester having a feeder housing for attachment to the header, the header comprising a header frame extending longitudinally from one end of the header to an opposed end of the header in a direction transverse to a direction of intended working movement, and including support means extending forwardly of said direction, a cutting knife assembly mounted on said support means so as to be located at a forward edge of the header for cutting a standing crop, crop transporting means mounted on the header frame for transporting the cut crop longitudinally of the header frame, coupling means on the header frame for attachment of the header frame to the feeder housing of the combine harvester, said coupling means arranged for support of the header frame on the feeder housing to allow raising and lowering of the header frame by the combine harvester in conjunction with the feeder housing, means defining an opening adjacent the coupling means for discharge of transported cut crop through the opening for entry into the feeder housing, first and second gauge wheel means, first and second mounting means each mounting a respective one of the gauge wheel means on the header frame at a position thereon between said coupling means and a respective one of the ends of the header frame for engaging the ground and for applying a force to the header frame to raise the header frame to tend to maintain the respective end of the header frame at a constant height relative to the ground, the method comprising operating the combine harvester to raise the header to a position in which the gauge wheels are substantially free from the ground, rotating the gauge wheel means from a gauge wheel position aligned with said direction to a transportion position aligned with a transport direction substantially at right angles to said direction, lowering the header onto ground wheels carried by the header such that the header is fully supported by the ground wheels, disconnecting the header from the combine harvester, and connecting a hitch member from the header to a towing vehicle to apply a towing force along said transport direction, said ground wheels comprising said gauge wheel means.

According to a third aspect of the invention there is provided crop harvesting machine comprising a header frame extending longitudinally from one end of the machine to an opposed end of the machine in a direction transverse to a direction of intended working movement, and including support means extending forwardly of said direction, a cutting knife assembly mounted on said support means so as to be located at a forward edge of the machine for cutting a standing crop, crop transporting means mounted on the header frame for transporting the cut crop longitudinally of the header frame, means defining an opening for discharge of transported cut crop through the opening first and second ground wheel means, first and second mounting means each mounting a respective one of the ground wheel means on the header frame at a position thereon adjacent a respective one of the ends of the header frame for engaging the ground, each of said first and second mounting means being arranged to allow rotation of the respective ground wheel means from a working position aligned with said direction to a transport position substantially at right angles to said direction for transport of the header, wherein said first ground wheel means comprising an elongate beam, a first ground wheel mounted at one end of the beam, a second ground wheel mounted at an opposed end of the beam, each of the ground wheels having an axis of rotation longitudinal of the beam, and means mounting the beam on the header frame for rotation of the beam relative to the header frame about a beam axis transverse to the beam between the ground wheels from the working position in which the beam lies longitudinal of the frame to the transport position in which the beam lies transverse to the frame with the first ground wheel on one side of a line longitudinal of the header and passing through the centre of gravity of the header and the second ground wheel on an opposed side of said line.

One or more embodiments of the invention will now be described in conjunction with the accompanying drawings.

BRIEF DESCRIPTION OF THE DRAWINGS

FIG. 6 is a view along the lines 6—6 of FIG. 4 showing the bracket for attachment of the gauge wheel to the header frame on an enlarged scale.

FIG. 7 is a view along the lines 7—7 of FIG. 6.

In the drawings like characters of reference indicate corresponding parts in the different figures.

DETAILED DESCRIPTION

Figure 1:
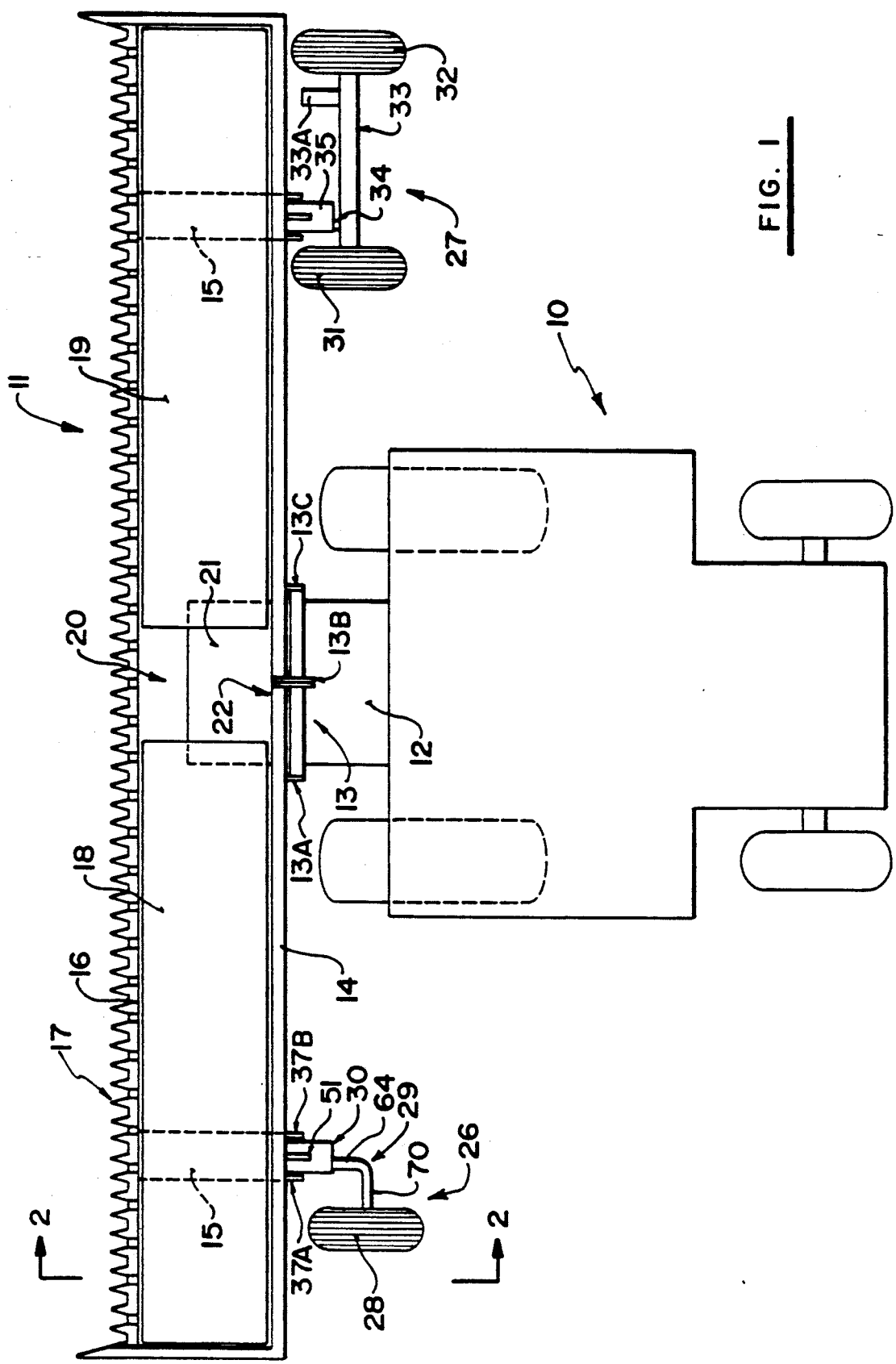
FIG. 1 is a top plan view of a combine harvester including a header according to the present invention showing the gauge wheels thereof in the working position.

Reference is first made to the above U.S. Pat. No. 5,005,343 of the present assignees which shows some detail of the header on which the design of the present embodiment is based. That header is generally used in conjunction with a conventional combine harvester generally indicated at 10 with a header indicated at 11.

The conventional combine harvester is shown only schematically and includes a feeder housing 12 through which the crop from the header is intended to pass into the main body of the combine harvester. The feeder housing includes a front mounting section 13 shown only schematically which is coupled to the header to provide support of the header for movement across the ground.

Most conventional headers are rigidly coupled to the front of the feeder housing so as to remain at a predetermined orientation directly across the front of the combine harvester. The present header is however mounted in a manner including a linkage including as shown three links 13A, 13B and 13C or four links which allow some pivotal movement of the header to occur about a horizontal axis extending forwardly along the line of intended working direction of the combine harvester.

The header conventionally comprises a main frame tube 14 extending along the full length of the header which acts as the main backbone providing rigidity to the header. The frame further includes a plurality of generally L-shaped frame members 15 which extend vertically downwardly from the tube 14 and then have a leg section extending forwardly from a lower end of the vertical portion. At the forward end of the L-shaped leg sections is provided a flange 16 on which is mounted a conventional sickle knife 17 for cutting the standing crop. The standing crop is transported inwardly of the header by a pair of side drapers 18 and 19 which provide an upper run of the canvas extending from the outside end of the header inwardly toward a central section generally indicated at 20. At the central section is provided a feed draper 21 which moves the crop which has been fed to the centre section rearwardly through an opening 22 at the feeder housing. A rotating confining and feeding member 23 is provided at the feeder housing to assist in directing the material downwardly and rearwardly into the feeder housing for proper supply to the combine harvester. A reel 24 is mounted on reel arms 25 supported from the tube 14 in conventional manner.

All of the above features are shown and described in the above mentioned U.S. patent and further details can be obtained from study of that patent. For convenience of illustration the reel and the confining member are omitted from FIGS. 1 and 3 and the reel and the draper are omitted from FIG. 5.

Figure 2:
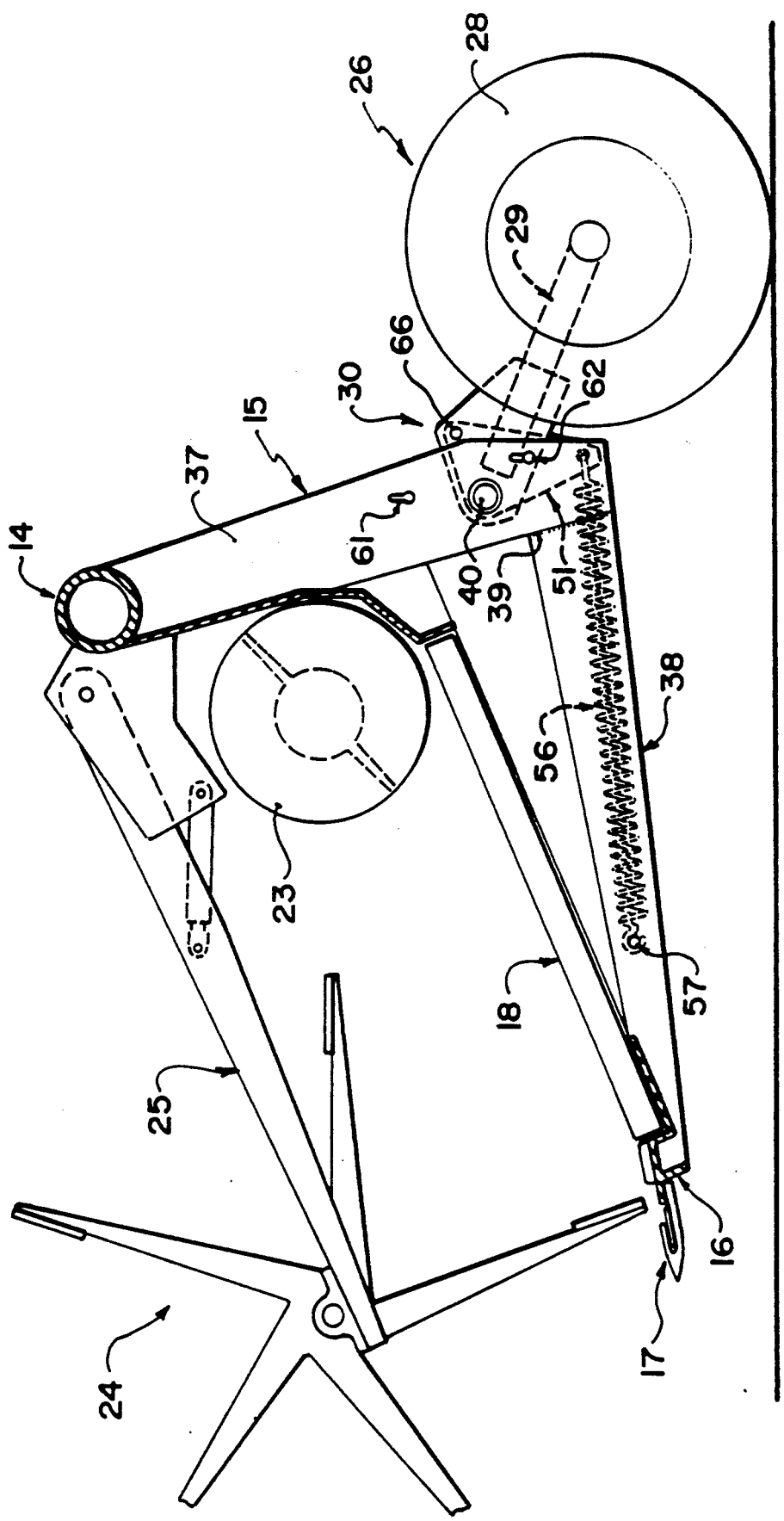
FIG. 2 is a cross sectional view along the lines 2—2 of FIG. 1.

The previous machine of the present assignees also includes a pair of gauge wheels mounted on the rear part of the L-shaped frames 15 so as to project rearwardly from the frame in a manner similar to that shown in FIG. 2. However in the previous machine the gauge wheels are simply provided to act as gauge wheels and are spring loaded into engagement with the ground. In the transportation of the machine previously manufactured, the header is simply mounted on a separate trailer in conventional manner whereupon the gauge wheels do not in any way assist in the transportation process.

The machine as shown herein however is modified so that the gauge wheels can also be used for the transportation of the header when disconnected from the combine harvester.

The gauge wheels therefore comprise a left hand gauge wheel system generally indicated at 26 and a right hand gauge wheel system generally indicated at 27. The gauge wheel system 26 includes a single gauge wheel 28 mounted upon an arm 29 carried upon a bracket 30 pivotally connected to the rear part of the frame 15. The right hand gauge wheel system includes a pair of ground wheels 31 and 32 mounted upon a beam 33 for rotation about the longitudinal axis of the beam 33. The beam is mounted on an arm 34 carried by a bracket 35 which is similar in construction to the bracket 30 again carried upon the rear part of the right hand frame member 15.

The construction of the brackets 30 and 35 is shown in more detail in FIGS. 6 and 7. The L-shaped frame member 15 comprises a pair of channels 37 and 38 connected together at a weld line 39. The open face of the channel 37 is arranged at the rear edge so that two side flanges 37A and 37B are defined facing rearwardly from a web at the front of the channel. In between the flanges 37A and 37B is mounted the bracket generally indicated at 30. The bracket 30 is mounted upon a pin 40 extending horizontally across the flanges 37A and 37B and supported thereby. The bracket 30 includes a sleeve 41 surrounding the pin so as to be rotatable about the axis of the pin. The bracket 30 further includes a pair of side plates 42 and 43 supported in parallel spaced position by a pair of cross plates 44 and 45 to define therein a substantially rectangular chamber extending outwardly away from the sleeve 41. An end plate 46 is connected to the end face of the chamber opposite to the sleeve 41. The side plates 42 and 43 extend forwardly and rearwardly beyond the plates 44 and 45 to apexes 47 and 48 thus providing abutment portions for controlling the pivotal movement of the bracket around the pin 40. The sleeve 41 and the plates 44 and 45 are slotted as indicated at 50 to receive a plate 51 parallel to the side plates 42 and 43 and located midway therebetween. The plate 51 is rotatable on the pin 40 but is not coupled to the bracket 30 so that it is free to rotate on the pin relative to the bracket. The plate 51 as best shown in FIG. 7 extends rearwardly from the pin 40 to an apex 52 adjacent which is located an opening 53. The plate 51 also extends rearwardly and downwardly from the pin 40 to a second apex 54 adjacent which is located a second opening 55. The opening 55 receives one end of a spring 56 which is shown in FIG. 2 and extends along the interior of the lower channel 38 to an opposed end coupled to a fixed point 57. The spring thus acts to rotate the plate 51 in a clockwise direction. The side plates 42 and 43 have formed therein three openings 58, 59 and 60 for location of the plate relative to the plate 51 and relative to the flanges 37A and 37B. The openings 58 and 59 are arranged to cooperate with the opening 53 in the plate 51. The opening 60 is arranged to cooperate with openings 61 and 62 visible best in FIGS. 2 and 5.

Within the chamber defined by the side plates 42 and 43 and the upper and lower plates 44 and 45 is formed a sleeve 63 which receives an inner portion 64 of the arm 29. The portion 64 can therefore rotate about the longitudinal axis of the portion 64 within the sleeve. It is prevented from longitudinal movement by a locating element 65.

As described above the bracket 30 is identical to the bracket 35 and the first part 64 of the arm 29 is equal to the first part 64 of the arm 34. The arm 34 extends only a short distance out of the end of the bracket defined by the end plate 46 and is then rigidly coupled to the beam 33 at one end of the beam adjacent the wheel 31.

The arm 29 however extends outwardly further from the bracket and then is cranked at right angles to form a second portion 70 extending longitudinally of the frame to the wheel 28. The arm 29 thus can rotate about the axis of the portion 64 and also the beam 33 can rotate about the axis of the portion 64 at the other end of the header.

In operation, assuming an initial position of the combine harvester which is the working position, this is achieved by connecting the brackets 30 and 35 to the respective plate 51 by passing a pin 66 through the opening 53 and the plate 51 and through one of the openings 58 and 59 in the bracket. The openings 58 and 59 as well the openings 61 and 62 are key-hole shaped to provide a simple latching system for the pin which includes a transverse lock member projecting outwardly to a side of the pin which is the same side as a weighted handle. Thus the pin is inserted with a lock member pointing upwardly and passing through the slot portion of the keyhole opening and then the weighted handle rotates the pin so that the lock member prevents the pin from coming out of position.

With the bracket therefore coupled to the plate 51, the spring tension from the spring 56 pulls the gauge wheel in a clockwise direction that is to bias it toward the ground but allows movement of the gauge wheel upwardly relative to the frame in a floating action. In this position the header is mainly carried by the feeder housing of the combine harvester with the gauge wheels simply acting to gauge the position of the header and to provide the slight twisting of the header about the feeder housing relative to the forward pivot axis.

In the guage position, the arm 29 is locked by a pin passing through an opening 85 holding the portion 64 against rotation relative to the sleeve 63. In the working position the beam 33 acts as a walking beam pivoting about the portion 64 which trails rearwardly of the frame and thus defines a substantially horizontal axis about which the walking beam pivots.

Figure 4:
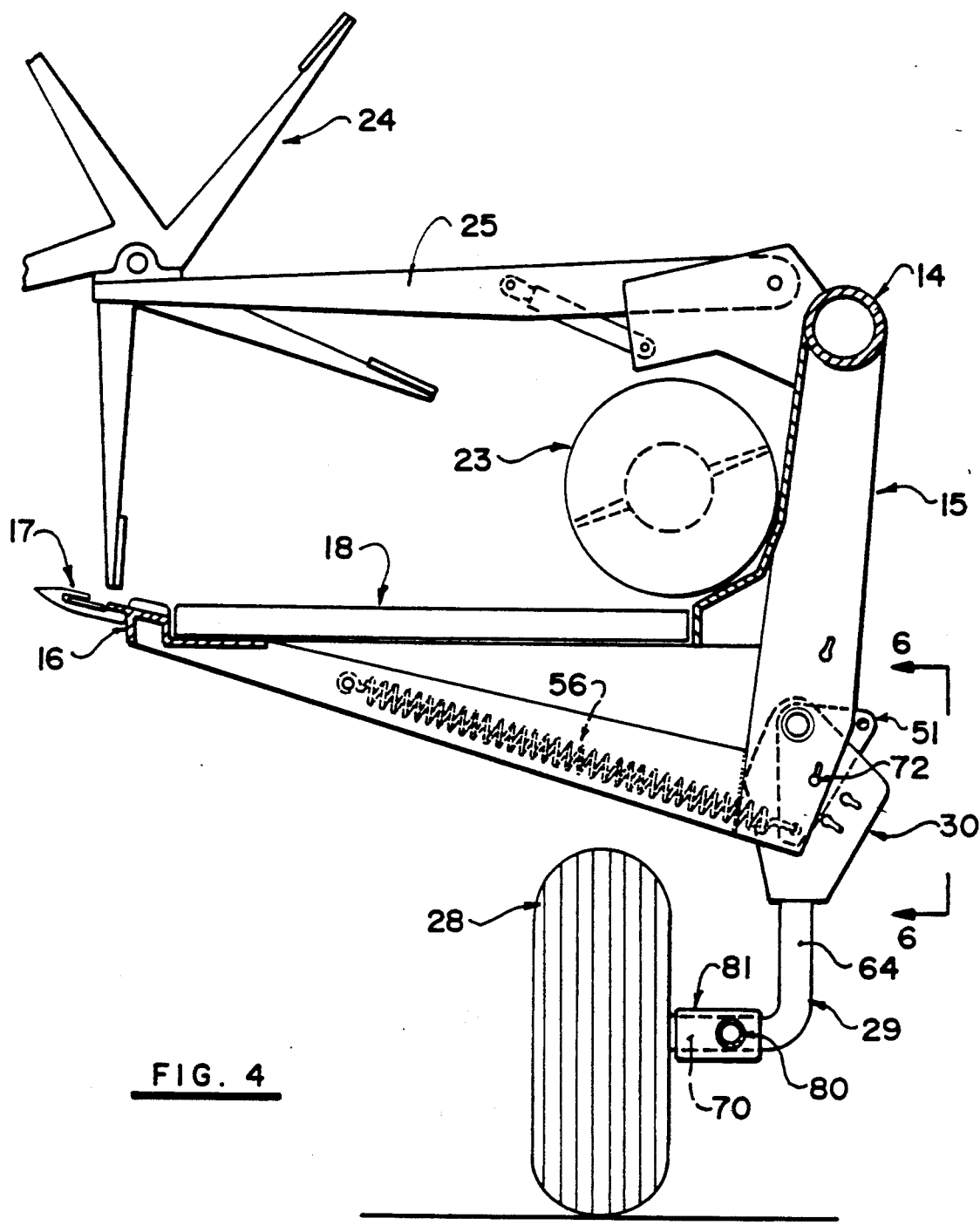
FIG. 4 is a cross sectional view along the lines 4—4 of FIG. 3.
Figure 5:
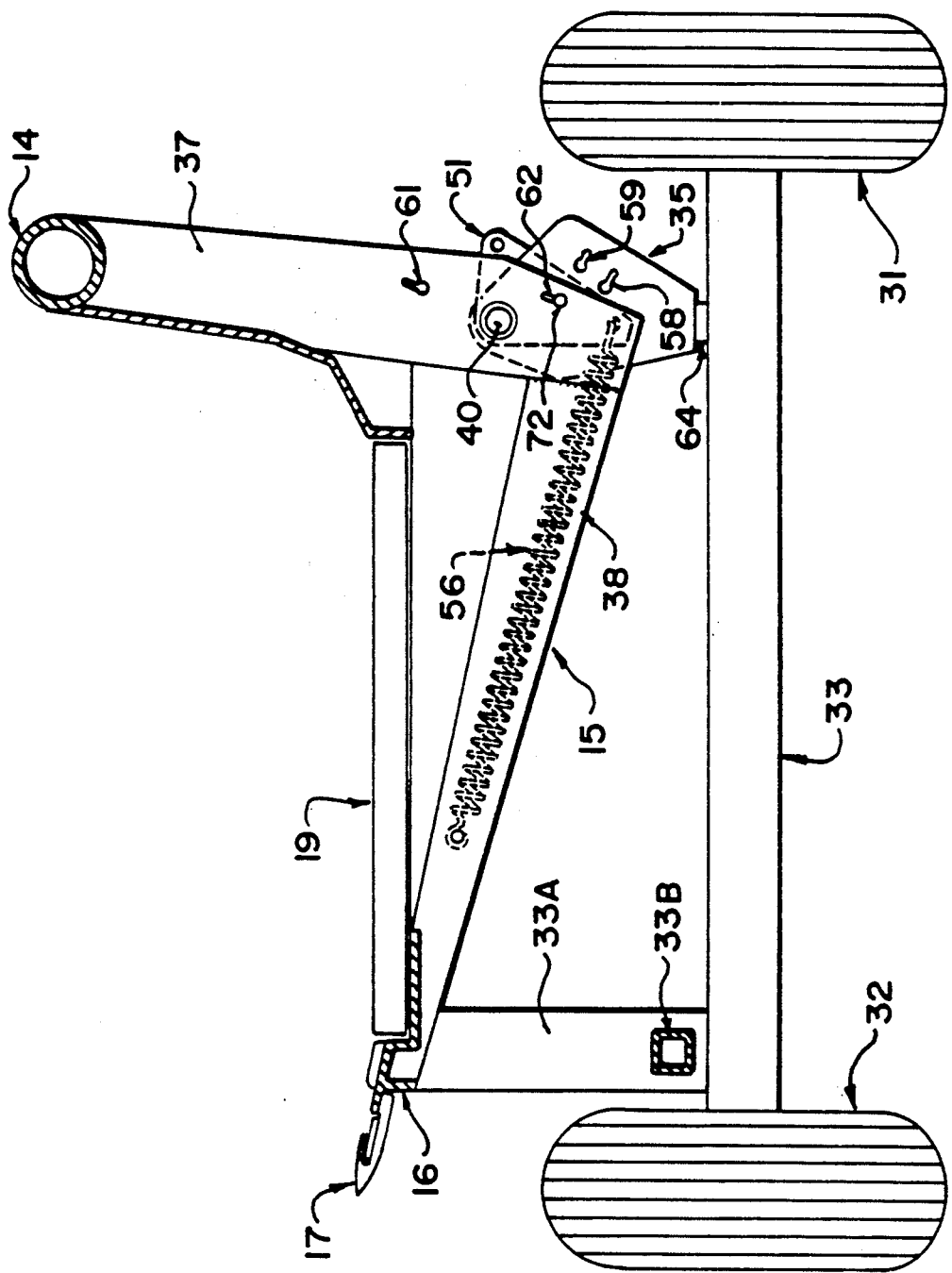
FIG. 5 is a cross sectional view along the lines 5—5 of FIG. 3.

When it is desired to move the header to the transport position, the header is raised by the combine harvester to a fully raised position in which the gauge wheels are removed from the ground and thus are free to pivot about pin 40 downwardly and forwardly to take up the positions shown in FIGS. 4 and 5. the pins 66 are removed from the working position thus releasing the brackets 30 and 35 to pivot relative to the plates 51. The brackets 30 and 35 are locked in position by a pin 72 passing through the openings 62 and through the cooperating opening 60 in the brackets 30 and 35. The bracket is thus locked in a vertically depending position. Further forward movement of the bracket beyond the vertically depending position is prevented by the engagement of the apex 48 with the rear web of the channel 37.

With the gauge wheels thus removed from the ground, the pin through opening 25 is removed to allow the gauge wheels to pivot about the portion 64. This portion defines a vertical axis at this time due to the depending position of the bracket as shown in FIG. 7. The arm 29 can thus be pivoted in a direction as shown in FIG. 4 to a position in which the wheel 28 lies underneath the header and particularly the draper section of the header at a position approximately on the line of the centre of gravity on the header. The arm 29 remains free to pivot about the vertical axis of the portion 64.

Figure 3:
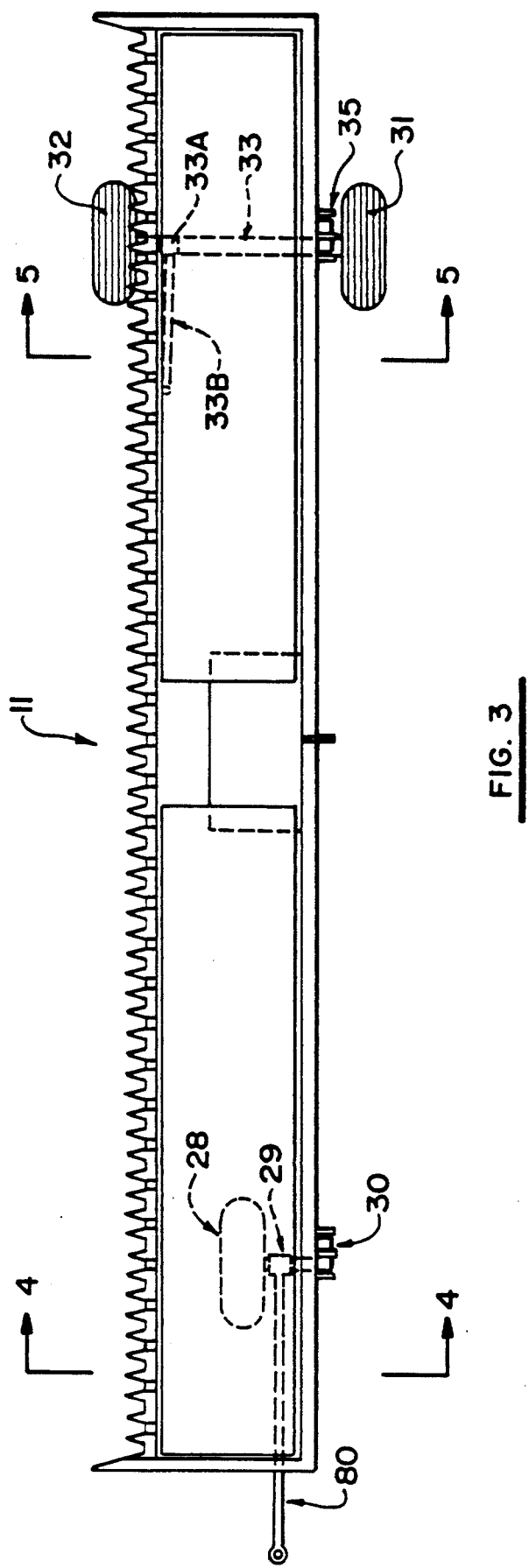
FIG. 3 is a top plan view of the header of FIG. 1 showing the gauge wheels in the transport position.

At the same time the beam 33 is pivoted about the portion 64 of the bracket 35 so that the beam takes up a position transverse to the header as shown in FIGS. 3 and 5. The length of the beam is such that the wheel 31 remains projecting outwardly from the rear of the header frame and the wheel 32 projects just beyond the knife 17 of the header. The beam 33 further includes a beam portion 33A projecting outwardly therefrom at right angles in a direction so that it extends vertically upwardly from the beam when in the position shown in FIG. 5. This beam portion 33A is shaped to receive the flange 16 resting thereupon to provide two support points for the rear part of the header on either side of the centre of gravity one defined by the portion 64 and the other defined by the beam 33A.

As the header is supported above the ground at this point both of the wheel arrangements can be moved into this position freely manually and without the necessity for hydraulic drive systems. The pin through the opening 85 is removed to allow rotation of the arm 29 relative to the bracket. The increased length of the arm 29 relative to the arm 34 raises the end of the header adjacent the wheel 28. A brace 33B is then coupled between the upright 33A and a suitable location on the header frame to hold the beam 33 in the required transverse position for transportation.

With the gauge wheel arrangements thus moved to the transport position, the header can be carefully lowered into contact with the ground to be supported wholly upon the gauge wheel arrangements. In this position the header is disconnected from the feeder housing by simple disconnection of the links 13A, 13B, 13C in conventional manner. The header is thus entirely free from the combine harvester. A hitch pole 80 is then coupled from a towing vehicle to the arm 29 at the horizontal portion of the arm 29. The hitch pole 80 includes a rear channel portion 81 which wraps over the horizontal portion of the arm 29 and acts to steer that horizontal portion by side to side movement of the hitch pole 80.

After transportation is complete, the header can be reattached to the combine by reversing the process to revert to the working position previously described.

As shown in FIG. 1, the wheel 32 is arranged at the end of the header frame that is outwardly of the bracket 35. The beam 33 can be rotated through 180° so that it is possible for the wheel 32 to be located inwardly of the bracket 35 with the wheel 31 outwardly thereof. Similarly the arm 29 can be rotated through 180° so that the wheel 28 lies inwardly of the bracket 30.

The transportation system is entirely self contained in that it is fully part of the header itself and does not require any additional elements to be transported with the system and attached separately. The additional wheel 32 does not in any way interfere with the operation in the working position.

Although shown and described above in conjunction with a combine harvester, the header shown can also be used with a conventional swather tractor. In this case, additional weight may be added to the tractor when the header is removed to enable the tractor alone to be steered in a stable manner by the hydraulic drive system, or alternatively positive steering may be provided to the rear wheels.

A further design of header may also be provided for use with a known bi-directional tractor to enable the tractor and header unit to act as a swather. On this design, the same arrangement of guage wheel transport system can be employed. Furthermore, a similar design of transport system and support wheel arrangement can be used on a pull-type swather arrangement in which the header is attached to or integral with a hitch member for coupling to a separate tractor unit.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. A header for attachment to a feeder housing of a combine harvester comprising a header frame extending longitudinally from one end of the header to an opposed end of the header in a direction transverse to a direction of intended working movement, and including support means extending forwardly of said direction, a cutting knife assembly mounted on said support means so as to be located at a forward edge of the header for cutting a standing crop, crop transporting means mounted on the header frame for transporting the cut crop longitudinally of the header frame, coupling means on the header frame for attachment of the header frame to the feeder housing of the combine harvester, said coupling means arranged for support of the header frame on the feeder housing to allow raising and lowering of the header frame by the combine harvester in conjunction with the feeder housing, means defining an opening adjacent the coupling means for discharge of transported cut crop through the opening for entry into the feeder housing, first and second gauge wheel means, first and second mounting means each mounting a respective one of the gauge wheel means on the header frame at a position thereon between said coupling means and a respective one of the ends of the header frame for engaging the ground, each of said first and second mounting means being arranged to allow rotation of the respective gauge wheel means from a gauge wheel position aligned with said direction to a transport position substantially at right angles to said direction for transport of the header, and ground wheel means carried on said header frame and arranged to provide support for the header frame relative to the ground when separated from the combine harvester for transportation movement substantially at right angles to said direction, said ground wheel means comprising said first and second gauge wheel means.

2. The header according to claim 1 wherein said ground wheel means consist solely of said first and second gauge wheel means.

3. The header according to claim 1 wherein said first gauge wheel means comprises an elongate beam, a first ground wheel mounted at one end of the beam, a second ground wheel mounted at an opposed end of the beam, each of the ground wheels having an axis of rotation longitudinal of the beam, and means mounting the beam on the header frame for rotation of the beam relative to the header frame about a beam axis transverse to the beam between the ground wheels from the gauge wheel position in which the beam lies longitudinal of the frame to the transport position in which the beam lies transverse to the frame with the first ground wheel on one side of a line longitudinal of the header and passing through the centre of gravity of the header and the second ground wheel on an opposed side of said line.

4. The header according to claim 3 wherein said means mounting said beam on the header frame allows movement of the beam such that, in the gauge wheel position the beam axis is in a substantially horizontal orientation so that the beam acts as a walking beam pivoting about the beam axis to allow relative up and down movement of the first and second ground wheels, and such that the beam axis can be pivoted to a vertical orientation to allow movement of the ground wheels to the transport positions.

5. The header according to claim 4 wherein the beam axis is arranged adjacent the first ground wheel.

6. The header according to claim 3 wherein the second gauge wheel means comprises a single ground wheel such that the header is supported on the single ground wheel, the first ground wheel and the second ground wheel arranged at apexes of a triangle.

7. The header according to claim 6 including a hitch pole for connection between a towing vehicle and the single ground wheel when in the transport position for steering action of the single ground wheel about a vertical axis.

8. The header according to claim 3 including support means connected to said beam and arranged to engage said header frame at a position adjacent the cutting knife for support of the header frame at two transversely spaced locations thereon.

9. The header according to claim 1 wherein each of the first and second gauge wheel means is mounted on a respective support arm, each said support arm being mounted on a respective one of a pair of brackets connected to the header frame at spaced positions therealong, said brackets being arranged in the gauge wheel position such that the respective arm extends rearwardly from the bracket relative to said direction, said brackets each being mounted on the header frame for pivotal movement about a horizontal axis such that, when the header is raised by the combine harvester, each bracket can move downwardly about said horizontal axis causing the respective arm to move to a substantially vertical orientation, in which the first and second guage wheel means can move to the transport position by rotation about an axis longitudinal of the respective arm.

10. The header according to claim 9 including spring means biassing the brackets downwardly.

11. A method of transporting a header of a combine harvester having a feeder housing for attachment to the header, the header comprising a header frame extending longitudinally from one end of the header to an opposed end of the header in a direction transverse to a direction of intended working movement, and including support means extending forwardly of said direction, a cutting knife assembly mounted on said support means so as to be located at a forward edge of the header for cutting a standing crop, crop transporting means mounted on the header frame for transporting the cut crop longitudinally of the header frame, coupling means on the header frame for attachment of the header frame to the feeder housing of the combine harvester, said coupling means arranged for support of the header frame on the feeder housing to allow raising and lowering of the header frame by the combine harvester in conjunction with the feeder housing, means defining an opening adjacent the coupling means for discharge of transported cut crop through the opening for entry into the feeder housing, first and second gauge wheel means, first and second mounting means each mounting a respective one of the gauge wheel means on the header frame at a position thereon between said coupling means and a respective one of the ends of the header frame for engaging the ground and for applying a force to the header frame to raise the header frame to tend to maintain the respective end of the header frame at a constant height relative to the ground, the method comprising operating the combine harvester to raise the header to a position in which the gauge wheels are substantially free from the ground, rotating the gauge wheel means from a gauge wheel position aligned with said direction to a transportion position aligned with a transport direction substantially at right angles to said direction, lowering the header onto ground wheels carried by the header such that the header is fully supported by the ground wheels, disconnecting the header from the combine harvester, and connecting a hitch member from the header to a towing vehicle to apply a towing force along said transport direction, said ground wheels comprising said gauge wheel means.

12. The method according to claim 11 wherein the header is wholly supported by said gauge wheel means.

13. The method according to claim 11 wherein the first and second gauge wheel means are moved manually when the header is raised sufficiently to clear the gauge wheel means from the ground.

14. A crop harvesting machine comprising a header frame extending longitudinally from one end of the machine to an opposed end of the machine in a direction transverse to a direction of intended working movement, and including support means extending forwardly of said direction, a cutting knife assembly mounted on said support means so as to be located at a forward edge of the machine for cutting a standing crop, crop transporting means mounted on the header frame for transporting the cut crop longitudinally of the header frame, means defining an opening for discharge of transported cut crop through the opening, first and second ground wheel means, first and second mounting means each mounting a respective one of the ground wheel means on the header frame at a position thereon adjacent a respective one of the ends of the header frame for engaging the ground, each of said first and second mounting means being arranged to allow rotation of the respective ground wheel means from a working position aligned with said direction to a transport position substantially at right angles to said direction for transport of the header, wherein said first ground wheel means comprising an elongate beam, a first ground wheel mounted at one end of the beam, a second ground wheel mounted at an opposed end of the beam, each of the ground wheels having an axis of rotation longitudinal of the beam, and means mounting the beam on the header frame for rotation of the beam relative to the header frame about a beam axis transverse to the beam between the ground wheels from the working position in which the beam lies longitudinal of the frame to the transport position in which the beam lies transverse to the frame with the first ground wheel on one side of a line longitudinal of the header and passing through the centre of gravity of the header and the second ground wheel on an opposed side of said line, wherein said means mounting said beam on the header frame allows movement of the beam such that, in the working position the beam axis is in a substantially horizontal orientation so that the beam acts as a walking beam pivoting about the beam axis to allow relative up and down movement of the first and second ground wheels, and such that the beam axis can be pivoted to a, substantially vertical orientation to allow movement of the ground wheels to the transport position.

15. The machine according to claim 14 wherein the beam axis is arranged adjacent the first ground wheel.

16. The machine according to claim 14 wherein the second gauge wheel means comprises a single ground wheel such that the header is supported on the single ground wheel, the first ground wheel and the second ground wheel being arranged at apexes of a triangle.

17. The machine according to claim 16 including a hitch pole for connection between a towing vehicle and the single ground wheel when in the transport position for steering action of the single ground wheel about a vertical axis.

18. The machine according to claim 14 wherein each of the first and second ground wheel means is mounted on a respective one of a first and a second support arm, the first support arm defining said beam axis longitudinally thereof and the second support arm defining an arm axis longitudinally thereof, each said support arm being mounted on a respective one of a pair of brackets connected to the header frame at spaced positions therealong, said brackets being arranged in the working position such that the beam axis of the first support arm and the arm axis of the second support arm each extend rearwardly from the bracket relative to said direction, said brackets each being mounted on the header frame for pivotal movement about a horizontal axis such that, when the header is raised, each bracket can move downwardly about said horizontal axis causing the beam axis and the arm axis of the respective support arm to move to a substantially vertical orientation, in which the first and second ground wheel means can move to the transport position by rotation about a respective one of said beam axis and said arm axis.

19. The machine according to claim 14 including support means to said beam and arranged to engage said header frame at a position adjacent the cutting knife for support of the header frame at two transversely spaced locations thereon.

20. The header according to claim 18 including spring means biassing the brackets downwardly.

21. A crop harvesting machine comprising a header frame extending longitudinally from one end of the machine to an opposed end of the machine in a direction transverse to a direction of intended working movement, and including support means extending forwardly of said direction, a cutting knife assembly mounted on said support means so as to be located at a forward edge of the machine for cutting a standing crop, crop transporting means mounted on the header frame for transporting the cut crop longitudinally of the header frame, means defining an opening for discharge of transported cut crop through the opening, first and second ground wheel means, first and second mounting means each mounting a respective one of the ground wheel means on the header frame at a position thereon adjacent a respective one of the ends of the header frame for engaging the ground, each of said first and second mounting means being arranged to allow rotation of the respective ground wheel means from a working position aligned with said direction to a transport position substantially at right angles to said direction for transport of the header, wherein said first ground wheel means comprising an elongate beam, a first ground wheel mounted at one end of the beam, a second ground wheel mounted at an opposed end of the beam, each of the ground wheels having an axis of rotation longitudinal of the beam, and means mounting the beam on the header frame for rotation of the beam relative to the header frame about a beam axis transverse to the beam between the ground wheels from the working position in which the beam lies longitudinal of the frame to the transport position in which the beam lies transverse to the frame with the first ground wheel on one side of a line longitudinal of the header and passing through the centre of gravity of the header and the second ground wheel on an opposed side of said line, wherein each of the first and second ground wheel means is mounted on a respective one of a first and a second support arm, the first support arm defining said beam axis longitudinally thereof and the second support arm defining an arm axis longitudinally thereof, each said support arm being mounted on a respective one of a pair of brackets connected to the header frame at spaced positions therealong, said brackets being arranged in the working position such that the beam axis of the first support arm and the arm axis of the second support arm each extend rearwardly from the bracket relative to said direction, said brackets each being mounted on the header frame for pivotal movement about a horizontal axis such that, when the header is raised, each bracket can move downwardly about said horizontal axis causing the beam axis and the arm axis of the respective support arm to move to a substantially vertical orientation, in which the first and second ground wheel means can move to the transport position by rotation about a respective one of said beam axis and said arm axis.

* * * * *